(12) United States Patent
Simpson et al.

(10) Patent No.: US 11,651,063 B2
(45) Date of Patent: May 16, 2023

(54) COMPONENT VERIFICATION AND REVOCATION

(71) Applicant: HEWLETT-PACKARD DEVELOPMENT COMPANY, L.P., Spring, TX (US)

(72) Inventors: Shell Simpson, Boise, ID (US); Brett Green, Boise, ID (US); Timothy P. Blair, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 264 days.

(21) Appl. No.: 16/603,828

(22) PCT Filed: Aug. 30, 2017

(86) PCT No.: PCT/US2017/049387
§ 371 (c)(1),
(2) Date: Oct. 8, 2019

(87) PCT Pub. No.: WO2019/045706
PCT Pub. Date: Mar. 7, 2019

(65) Prior Publication Data
US 2020/0184064 A1    Jun. 11, 2020

(51) Int. Cl.
*G06F 21/44*    (2013.01)
(52) U.S. Cl.
CPC ...... *G06F 21/44* (2013.01); *G06F 2221/2129* (2013.01); *G06F 2221/2139* (2013.01)

(58) Field of Classification Search
CPC ............ G06F 21/44; G06F 2221/2129; G06F 2221/2139
See application file for complete search history.

(56) References Cited

U.S. PATENT DOCUMENTS

| | | | |
|---|---|---|---|
| 7,280,772 B2 | 10/2007 | Adkins et al. | |
| 8,621,212 B2 | 12/2013 | Lim et al. | |
| 9,121,119 B2 | 9/2015 | Neill et al. | |
| 2003/0063311 A1 | 4/2003 | Covitt et al. | |
| 2005/0206694 A1 | 9/2005 | Wadley | |
| 2006/0098993 A1 | 5/2006 | Yang | |
| 2006/0140647 A1 | 6/2006 | Adkins et al. | |
| 2012/0134687 A1* | 5/2012 | Jones | G03G 15/0863 399/12 |
| 2013/0083096 A1 | 4/2013 | Rice et al. | |
| 2013/0290360 A1 | 10/2013 | Cunningham et al. | |
| 2015/0089630 A1* | 3/2015 | Lee | B41J 29/38 726/16 |
| 2015/0110504 A1* | 4/2015 | Lee | H04N 1/44 235/492 |

(Continued)

FOREIGN PATENT DOCUMENTS

| | | | | |
|---|---|---|---|---|
| WO | WO-2014035408 A1 * | 3/2014 | ......... | B41J 2/04506 |
| WO | WO-2016069023 A1 * | 5/2016 | ......... | G06F 3/1203 |

*Primary Examiner* — Daniel B Potratz
(74) *Attorney, Agent, or Firm* — Michael Dryja (57) ABSTRACT

In one example, a non-transitory computer readable medium for component verification and revocation includes instructions for a processor to verify that a component in a device is valid using a verification service and consequently enable a premium service. The processor may later use information from the verification service that the component is no longer valid and consequently alter the premium service.

9 Claims, 4 Drawing Sheets

(56) References Cited

U.S. PATENT DOCUMENTS

| | | | |
|---|---|---|---|
| 2016/0082740 A1* | 3/2016 | Jeran ..................... | G06F 3/0623 358/1.14 |
| 2016/0173284 A1 | 6/2016 | Jeran et al. | |
| 2016/0187827 A1* | 6/2016 | Jeran ..................... | H04L 9/3247 399/12 |
| 2017/0163641 A1 | 6/2017 | Adkins et al. | |

* cited by examiner

COMPONENT VERIFICATION AND REVOCATION

BACKGROUND

Various devices, such as printing devices or systems (e.g., printers, fax machines, copiers, and the like) may include replaceable components that are basic to the operation of the device. Several other device systems with replaceable components exist such as such as medical devices for assay machines, titration analysis, bacterial growth monitoring, and cancer identification. In one example, these replaceable components may include print cartridges that contain consumable material that is depleted with each use of the printing device. Verifying that a replaceable component is an authentic component from legitimate manufacturers, suppliers, or re-fillers may help avoid problems related to the use of remanufactured, imperfect, defective, and counterfeit components.

BRIEF DESCRIPTION OF THE DRAWINGS

The disclosure is better understood with reference to the following drawings. The elements of the drawings are not drawn to scale relative to each other. Rather, the emphasis has instead been placed upon clearly illustrating the claimed subject matter. Furthermore, like reference numerals may designate corresponding similar, though not inevitably identical, parts through the several views.

DETAILED DESCRIPTION

There have been several different methods of component verification proposed or used which have tended to penalize users for using modified or counterfeit replaceable components that may detrimentally harm an electronic device. For instance, with printing device systems, there may be several features of the device that relies on proper pH, viscosity, color additives, and chemical composition to deliver the promised print quality. Medical devices that use replaceable components for assays may rely on proper sample sizes, substrate chemical properties, certified deposited chemical or biological samples, and the like to meet strict federal safety guidelines. Rather than penalizing users by limiting the use of their device, a technique is proposed herein that users be encouraged to use authenticated, certified, or otherwise verified components by offering them premium services when using verified components. If users are later detected using unauthenticated or invalid components that once were authenticated as valid, their premium services may be altered such as by disabling, canceling, limiting, or not extending the respective premium services.

Figure 1:
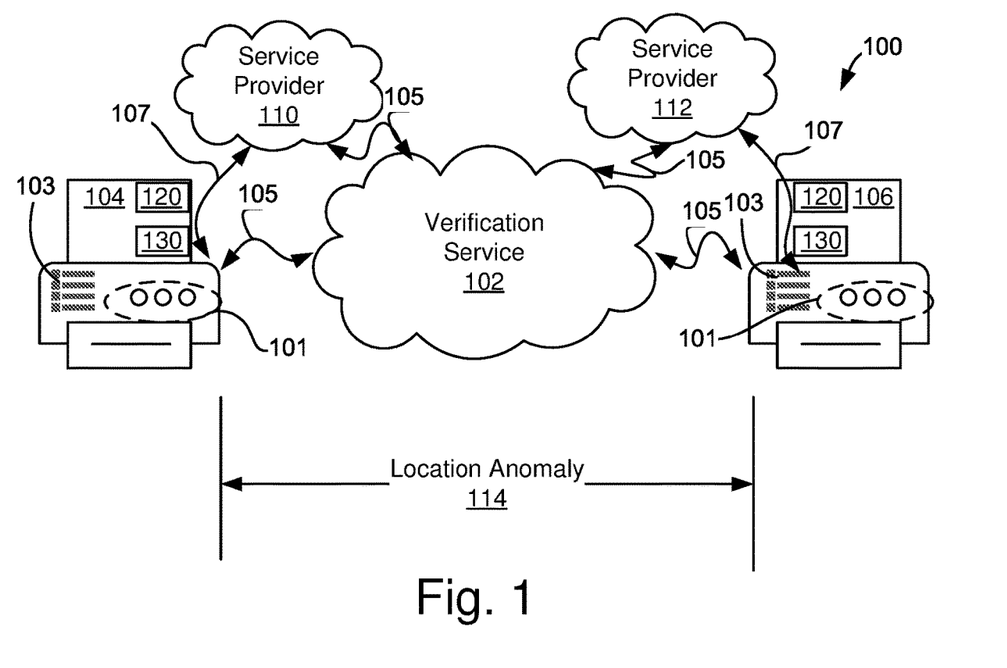
FIG. 1 is an illustration of an example environment for component verification and revocation in a device.

FIG. 1 is an illustration of an example environment 100 for component verification and revocation in a device, such as first device 104 and second device 106, in this example printing devices. The first and second devices 104, 106 may include replaceable components 101, which for a printer may be an ink or other fluid cartridge and/or printhead, toner cartridges, wax cartridges, and the like. First and second devices 104, 106 include a processor 120 coupled to non-transitory computer readable memory 130 that includes software for managing the validation of the replaceable components 101 as authentic, the enabling of premium services 103, the revocation of the previous validation, and altering of the premium services 103 when needed. The first and second devices 104, 106 may be communicatively coupled to a verification service 102 through first communication links 105. The verification service 102 may be an online verification service that can provide a regional or worldwide authentication. The first and second devices 104, 106 may include device based premium services 103 accessible via a user interface. The first and second devices 104, 106 may also, alternatively or in addition to, be communicatively coupled to premium service providers such as first service provider 110 and second service provider 112 with either first communication links 105 or second communication links 107. The first and second service providers 110, 112 may also be communicatively coupled to the verification service 102 through first communication links 105 or another separate communication link for security. First and second communication links 105, 107 may be implemented separately or commonly using universal serial bus (USB) protocols, a parallel port interface, a serial port, wired, wireless, or optical networking and other communication links.

The premium services 103 may be performed by the corresponding device 104, 106 that the valid component 101 is used with, or they may be provided by the premium service providers 110, 112. More than one premium service 103 may be associated with a device 104, 106. Further, there may many different types of premium services 103. For example, various printer premium services 103 may include monetary or other financial credits or access to printing services such as deluxe photo printing, photo mounting and framing, book binding and page assembly, photo album generation, private printing, data storage and archiving of print jobs. Other premium services 103 may be optical character recognition services, translations, form printing, postal metering, calendar generation, scanning to email, printer user management, secure document monitoring, copyright and trademark violation identification. Still, more premium services 103 may be periodical news or stock market reporting, template letter generation, improved printing modes such as higher resolution or greater gamut printing, use of new types of printing medium, secure watermarking, and document tracking as just some of the many examples. Some premium services 103 may not be directly related to the device but may be provided as rewards. For instance, subscriptions to music, radio, satellite, the internet, or video streaming services, tickets for events, cleaning services, repair services, device maintenance services, and access to free or discounted apps that may run on the device 104, 106 or user's phones, computers, or other equipment. Accordingly, offering such premium services 103 encourage users to continue to replace used components 101 with new valid components that are authorized for use in device 104, 106.

Nevertheless, it may not always be possible to detect at initial installation that a component 101 is invalid or non-authentic and the premium service 103 may be given in error. For example, a cloned component may use an identification of an authentic component 101 that was purchased. However, the authentic component 101 may never have been used with the devices 104, 106. Therefore, a newly installed component 101 may be first authenticated as validated. The devices 104, 106 may keep a list of valid components 101, and this new component would then be added to the valid list.

Figure 2:
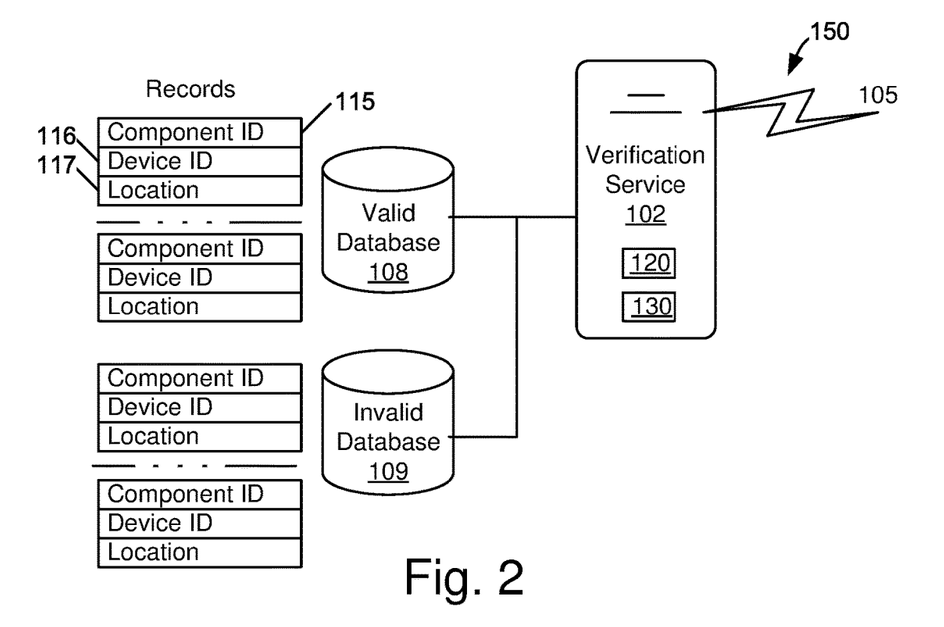
FIG. 2 is a block diagram of an example component verification service.

FIG. 2 is a block diagram 150 of an example component verification service 102. The verification service 102 may also include a processor 120 coupled to a computer readable medium 130 to provide some or all of a verification service 102 for components 101. The verification service 102 may be online, such as using the Internet, or it may be remotely accessed via dial-up or other communication links. The verification service 102 may be communicatively coupled to a valid database 108 and an invalid database 109. In some examples, the valid database 108 and invalid database 109 may be incorporated into a single database, but for the purposes of discussion herein, they will be treated as separate. The valid database 108 will generally be much larger than the invalid database 109 so having them separate may increase database table access times. The databases 108, 109 may be relational, non-relational, flat, table based, lists, spreadsheets, or other forms of data record organization. Referring to FIG. 1, the devices 104, 106 may also keep a list or database of invalid components that may be updated from time to time from the verification service 102. The valid list may also be sent to the verification service 102 to update a valid master list in valid database 108 or to check the device's valid list against records on the invalid list of validation service 102.

If the new component 101 happens to be one cloned component from several matching copies of an authentic component 101, there may be other similar cloned components in use either locally within a company or geographically dispersed worldwide. Consequently, data records in either or both databases 108, 109 may include a component ID 115, a device ID 116, and a location 117 among other information. Such other information may include a record identifier, a component model number, a component serial number, a component manufacturing date, a component remaining life percentage or expiration date, a verification counter, verification date, a usage counter, a verification result, a digital tag signature, and a security chip signature amongst many other possibilities.

Therefore, a verification service 102 may be globally-based and used to receive digital signatures or other component IDs 115, along with device IDs 116 and a geographical location 117 of component 101. The location 117 need not be just geographical but may instead be or include other locating information such as network address, network domains, telephone area codes and numbers, internet service provider information, and the like. This global verification service 102 may then help determine if the newly installed component 101 is valid (authentic) or invalid (non-authentic).

If a copy of the newly installed component ID 115 is found in a valid list and the respective corresponding device ID 116 of the installed component 101 differs from the one associated with the device ID 116 in the valid list, the newly installed component 101 may be an invalid component. Still, it may just be that a company or user is moving a component between one of their devices 104, 106 to the other, which could be for one of several acceptable and reasonable reasons, and thus alteration of the premium services 103 may not be fair or proper.

Accordingly, the corresponding locations 117 of the two devices are checked to see if there might be a location anomaly 114. A "location anomaly" is something that deviates from what is standard, normal, or expected between the location 117 and/or a number of devices 104, 106. The location anomaly 114 may be an inconsistency, irregularity, abnormality, aberration or other difference in location or usage at different locations depending on the context in which the location anomaly 114 is being considered. As noted, location 117 of device 104, 106 can be geographical, network based on IP addresses or domains, phone number based, and the like or combinations thereof. If the difference in location 117 varies too much, such as a different country, a large geographical distance, widely varying network IP addresses or network domains, and so forth, then there may be a high likelihood that the newly installed component 101 is a cloned component. A difference of usage at different locations may result in a location anomaly such as where a monotonic value or characteristic of a component 101 exhibits non-monotonic value behavior as a component 101 moves between different devices 104, 106. For instance, a "percentage life" value should not go up in value when component 101 is detected in another device 104, 106. Other example values or characteristics which should not change, or change beyond a certain range, based on location alone for printing devices include pH of the fluid, fluid levels, fluid composition, viscosity, change of dyes vs. pigments and vice versa, used drop counts, expiration dates, and born-on-dates.

The difference in location 117 may be paired with a check of the number of different devices 104, 106 associated with the same component ID 115 to increase the statistical chance of correct identification of an invalid component. For instance, if the difference in location 117 is slight or ignored, a first predetermined number of devices 104, 106 may be allowed before determining a component 101 is invalid, such as five (5) distinct device IDs 116. For instance, while component 101 may be moved within a company between different devices 104, 106 to verify operation, this will likely only happen once or twice. However, if such a verify operation happens at least the predetermined amount of times, five in this example, then a location anomaly 114 would be detected. In some examples, the predetermined amount may be varied depending on any determined location difference between the different devices 104, 106. If the location differences are large, such as different countries or different internet domains, then the predetermined number may be reduced to a lower number, such as two or three as examples. Two would allow for basing the location anomaly 114 on just a sufficient location difference while three would allow for some possible chances of a valid component 101 being transferred to a remote site for testing or other servicing, thereby preventing a potentially false alteration of premium services 103.

If a location anomaly 114 is detected by a device 104, 106, the device 104, 106 may notify the verification service 102. The verification service 102 can notify other devices 104, 106 that the component 101 is no longer valid (and likely counterfeit). The other device 104, 106 may alter the premium services 103 if the component 101 is present and previously determined as valid, or if a newly inserted component 101 with the respective device ID 116 is inserted in the other device 104, 106. In some examples, the verification service 102 may inform service providers 110, 112 of component IDs 115 on the invalid database. A service provider 110, 112 may determine that it is providing a premium service 103 for a component in devices 104, 106 that previously was determined to be valid but now has a component ID 115 on the invalid list. If so, then the service provider 110, 112 may immediately alter the premium service 103 or not allow the premium service 103 to renew at a later time. A service provider 110, 112 may also take into consideration the number of valid components previously associated with a device 104, 106 in determining when or how to alter premium services 103, if at all.

Alternatively, or in addition to, a service provider 110, 112 may also examine how many different devices 104, 106 are associated with the invalid component ID 115 and how many of the respective different devices 110, 106 are receiving premium services 103 before deciding on altering of the premium services 103. If the verification service 102 is continuously pushing an updated invalid list, then it is unlikely to have more than two devices 104, 106 using the same component ID 115 before the component 101 is determined invalid. However, if the verification service 102 only updates periodically, randomly, or occasionally or the service providers 110, 112 only pull updates from the verification service at various times, there may be more than two devices 104, 106 associated with the same invalid component ID 115, such as when component 101 is a cloned component. If the number of devices 104, 106 is larger than the predetermined amount, there may be significant user resistance or objections to having the premium service 103 altered, particularly if the period from when the premium service 103 was enabled is large. Therefore, the premium service provider 110, 112 may use various determined characteristics into consideration before any altering of any premium services 103. Such characteristics may include the number of distinct devices 104, 106, a determined amount of location anomalies 114 present, the country locations, the number of valid component IDs 115 associated with the respective devices 104, 106, and the length of time of providing the premium service 103.

The various examples of computer implemented methods and devices described herein may include logic or a number of functional components, modules, or constituents. Modules may constitute either software modules, such as code embedded in tangible non-transitory computer or machine readable medium) and/or hardware modules. A hardware module may be a tangible unit capable of performing certain operations and may be configured or arranged in certain manners. In one example, one or several computer systems or one or several hardware modules of a computer system in a device 104, 106 or verification service 102 may be configured by software (e.g., an application, or portion of the application) as a hardware module that operates to perform certain operations as described herein. The software may be organized into different subroutines, modules, containers, objects, and the like.

In some examples, a hardware module may be implemented as electronically programmable. For instance, a hardware module may include dedicated circuitry or logic that is permanently configured (e.g., as a special-purpose processor, state machine, a field programmable gate array (FPGA) or an application specific integrated circuit (ASIC) to perform certain operations. A hardware module may also include programmable logic or circuitry (e.g., as encompassed within a general-purpose processor or another programmable processor) that is temporarily configured by software to perform certain operations.

Figure 3A:
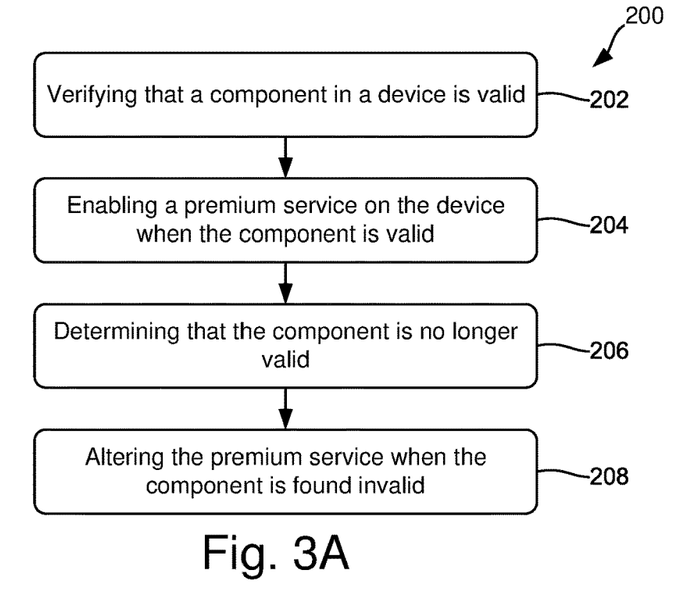
FIG. 3A is a flowchart of an example method of component verification and revocation.

FIG. 3A is a flowchart of an example method 200 of component verification and revocation. Method 200 may be a computer implemented method performed by a processor 120 in a device 104, 106 or verification service 102 or distributed among them. In block 202, the processor 120 verifies that a component 101 in the device 104, 106 is valid. Validity may be established by a device 104, 106 checking its internal databases and/or communicating with verification service 102 to ensure that a component ID 115 associated with component 101 is not in the invalid database 109. In some examples, particularly when communication with verification service 102 may not be available, the device 104, 106 may just check a local invalid database. In some examples, the verification service 102 may perform the verification of validity and relay the results to the respective device 104, 106. Accordingly, the device 104, 106 may send a location characteristic along with the component ID 115 and device ID 116 to allow the verification service 102 to add the location 117 of component 101 into the valid database 108 or invalid database 109.

In block 204, the processor 120 of device 104, 106 or verification service 102 may enable a premium service 103 for the device 104, 106 when the component 101 is determined to be valid. The premium service 103 may be a service provided by the device 104, 106 or it may be a premium service provided by or in conjunction with one or several service providers 110, 112 for the user or the device. The premium service 103 may be enabled by communicating between the processor 120 and the provider of the premium service 103.

In block 206, the processor 120 of the device 104, 106 or verification service 102 determines at some point of time later that the component 101 is no longer valid and may revoke the validity. The determination may be by notice of the verification service 102 that the component ID 115 of component 101 was reported on another device 104, 106 with a different device ID 116 and there is a location anomaly 114 such that alteration of the premium service 103 would be just and proper given the context and circumstances. For instance, if a component 101 was previously installed in first device 104 and determined valid but at a later time it was determined that is was installed in four other different and distinct devices, this valid component 101 would no longer be considered valid. This invalidity is because of the unlikelihood that component 101 would be moved between five distinct devices.

In block 208, the processor 120, alters the premium service 103 when component 101 is found invalid. This altering may include limiting the amount of or features of the premium service 103, disabling, canceling, or terminating the premium service 103, not extending the premium service 103, reducing the amount of credit applied for the premium service 103 and so forth. The processor 120 may alter the premium service 103 on the respective device 104, 106 if the service is performed locally. Alternatively, the processor 120 may inform the service provider 110, 112 directly via first or second communication links 105, 107 or indirectly via notifying verification service 102 that then notifies the appropriate service provider 110, 112. The processor 120 may also notify verification service 102 to alter any premium services 103 associated with other components 101 that have the same component ID 115 found on other devices 104, 106.

Figure 3B:
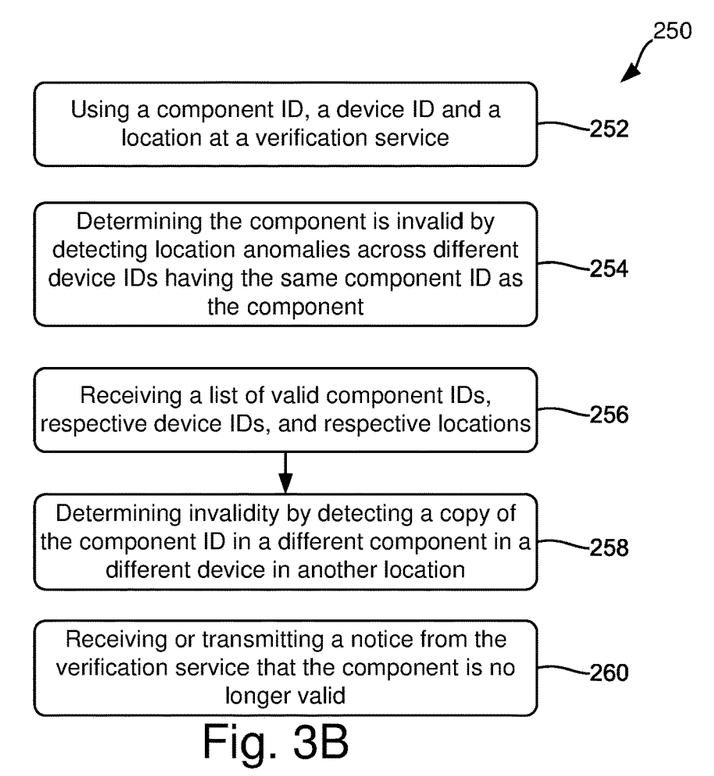
FIG. 3B is a flowchart of additional example operations that may be used in the method of FIG. 3A.

FIG. 3B is a flowchart of additional example operations 250 which may be used in the method 200 of FIG. 3A. For instance, in block 252, the processor 120 may verify a component 101 by using a record with a component ID 115, a device ID 116, and a location 117 of the device at the verification service 102. Verification service 102 may be implemented as one or several processors having one or several cores and may be a single, multiple physical or virtual computer distributed in one or several locations or cloud-based. Verification service 102 may in some examples be performed locally on a device 104, 106 that is designated as a master verification device for a networked or another communicatively coupled set of client devices 104, 106. In other examples, verification service 102 is a stand-alone server and devices 104, 106 are clients of the verification service 102. The verification service 102 may add a record of the component ID 115, the device ID 116 and the location 117 to the valid database 108 if component 101 is determined valid, or to the invalid database 109 if component 101 is determined invalid.

In block 254, the processor 120 when using the component ID 115, device ID 116, and location 117 may also determine the component 101 is valid or not by detecting location anomalies 114 across different device IDs 116 having the same component ID 115 as component 101. Accordingly, location anomalies 114 may be considered when determining validity, but in some instances, just the number of devices with the same component ID 115 may be used to determine validity. When used, the location anomalies 114 may be based on at least one of geographical distance, country or region analysis, company ownership, network protocol address, network domain, and phone number analysis as well as a number of distinct device 104, 106 with the same component ID 115.

In block 256, the processor 120 may receive a list of valid component IDs 115, respective device IDs 116, and respective locations 117. The verification service 102 may push this list, the device 104, 106 may request to pull the list from the verification service 102, or verification service 102 may request this list from valid database 108. In either case, the processor 120 may receive or transmit a notice from the verification service 102 that the component 101 is no longer valid as shown in block 260. The processor 120 in block 258, when detecting location anomalies 114, may then determine invalidity by detecting a copy of the component ID 115 in a different component 101 in a different device 104, 106 in another location 117. As discussed, the location anomaly 114 may be qualified by various geographical, country or region analysis, company ownership, network address or network domain, phone number analysis, and/or non-monotonic value behavior differences as well as a number of distinct devices 104, 106 with the same component ID.

Figure 4A:
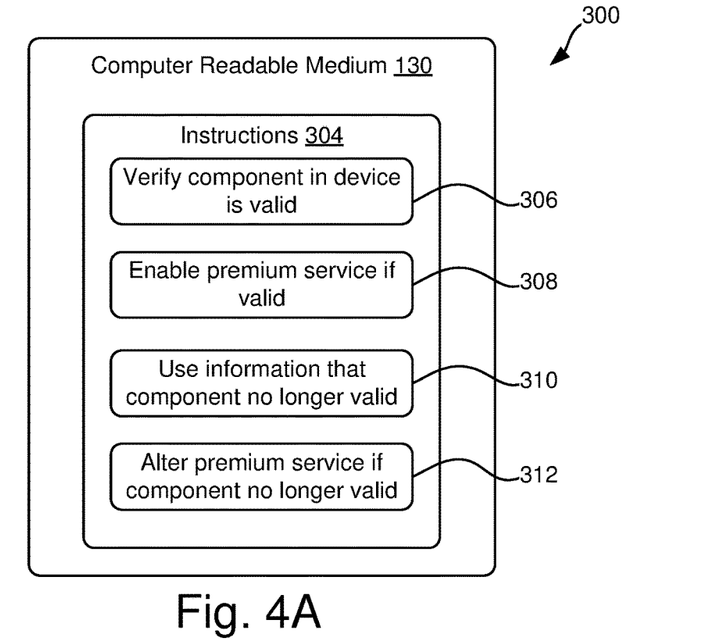
FIG. 4A is a block diagram of an example non-transitory computer readable medium including instructions for an example component verification and revocation operation.

FIG. 4A is a block diagram 300 of an example non-transitory computer readable medium 130 including instructions 304 for an example component verification and revocation operation. The computer readable medium 130 may be located on devices 104, 106 and/or verification service 102. A computer readable medium 130 allows for storage of sets of data structures (such as local variants of valid database 108 and invalid database 109) and instructions 304 (e.g., software, firmware, logic) embodying or utilized by any of the methodologies, operations, or functions described herein. The instructions 304 may also reside, completely or at least partially, with the static memory, the main memory, and/or within the processor 120 during execution by the computing system in the device(s) 104, 106. The main memory and the processor 120 memory also constitute computer readable medium 130. The term "computer readable medium" 130 may include single medium or multiple media (centralized or distributed) that store the instructions 304 or data and database structures. The computer readable medium 130 may be implemented to include, but not limited to, solid state, optical, and magnetic media whether volatile or non-volatile. Such examples include semiconductor memory devices (e.g., Erasable Programmable Read-Only Memory (EPROM), Electrically Erasable Programmable Read-only Memory (EEPROM), and flash memory devices). Magnetic discs such as internal hard drives and removable disks, magneto-optical disks, and CD-ROM (Compact Disc Read-Only Memory) and DVD (Digital Versatile Disc) disks may also be used.

In block 306, the instructions 304 allow the processor to verify that a component 101 in a device 104, 106 is valid using a verification service 102. The verification service may be local to the device 104, 106 or a separate online or offline verification service 102. The verification service 102 may have an application programming interface (API) accessible from the device 104, 106 or another method of communicating commands and returning responses. The verification service 102 may be on a local network, intranet, the Internet, or accessible via a non-networked communication link. The verification service 102 may be cloud-based in some examples, and other examples may be housed in a data center, computer warehouse and the like. The verification service 102 may provide one or various databases, such as valid database 108 and invalid database 109. The databases may be relational, non-relational, flat, lists, spreadsheets, and/or other data record organizations.

In block 308, the instructions 304 cause the processor to enable a premium service 103 when the component 101 is valid. The premium service 103 may be performed locally on the device or remotely by a service provider 110, 112. In block 310, the instructions further allow the processor to use, such as transmitting or receiving, information from the verification service 102 that the component 101 is no longer valid and in block 312 alter the premium service 103 when the component 101 is no longer valid.

Figure 4B:
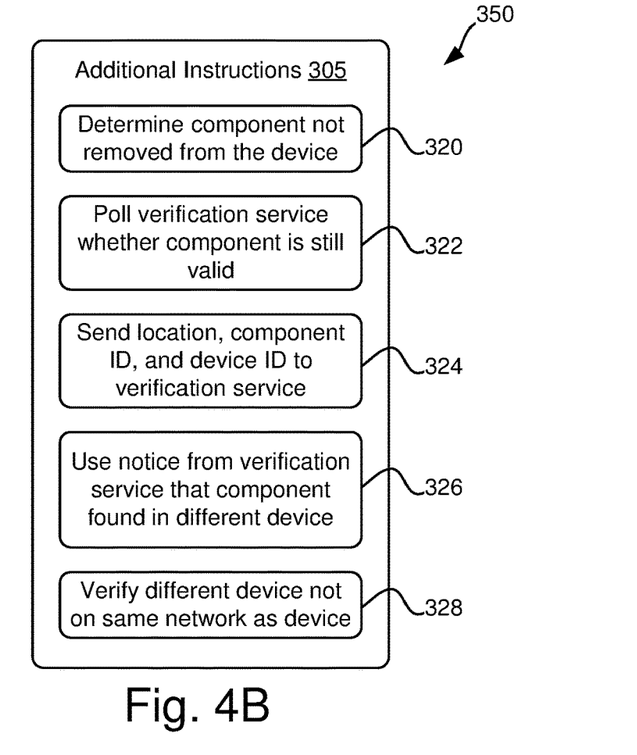
FIG. 4B is a block diagram of example additional instructions that may be included within the example computer readable medium of FIG. 4A.

FIG. 4B is a block diagram 350 of example additional instructions 305 that may be included individually or combined on the example computer readable medium 130 of FIG. 4A. In block 320 the additional instruction 305 may allow the processor 120 to determine that the component 101 has not been removed from the device 104, 106. If a component 101 has not been removed from the device 104, 106 and earlier determined valid but another component 101 has the same ID in another device 104, 106 then it is more likely that the component 101 in the device 104, 106 is a cloned component 101. It is unlikely that this situation is not simply a case of component 101 being transferred between devices 104, 106. Similarly, in this situation, non-removed component 101 is not likely a refilled or repaired component 101 unless those operations had been done in place. In block 322, the additional instructions 305 may cause the processor 120 to poll the verification service 102 periodically or randomly whether the component 101 is still valid. Some devices 104, 106 may be mobile, moved to other locations, and network or phone configurations changed. If so, the device 104, 106 may include additional instructions 305 in block 324 to allow the processor 120 to send a location 117 along with a component ID 115 and a device ID 116 to the verification service 102 to keep its databases 108, 109 up to date.

In block 326, the processor 120 may use, by either receiving or transmitting a notice from the verification service 102 that component 101 has been reported inserted in another device 104, 106 with a different device ID 116. Accordingly, the verification service 102 may alert the device 104, 106 with the notice when it determines that a previously verified component 101 is no longer valid and its previous verification revoked. The verification service 102 may also send along records of other components 101 with the same component ID 115, different respective device IDs 116, and respective locations 117. This sending of records permits the additional instructions 305 to allow the processor 120 to verify that the device with the different device ID 115 is not on the same network as the instant device 104, 106, such as within the same network domain or within a range of IP addresses. This location anomaly 114 checking allows for a check of local or inter-company component swapping and helps to prevent potential false altering of premium services 103.

Figure 5A:
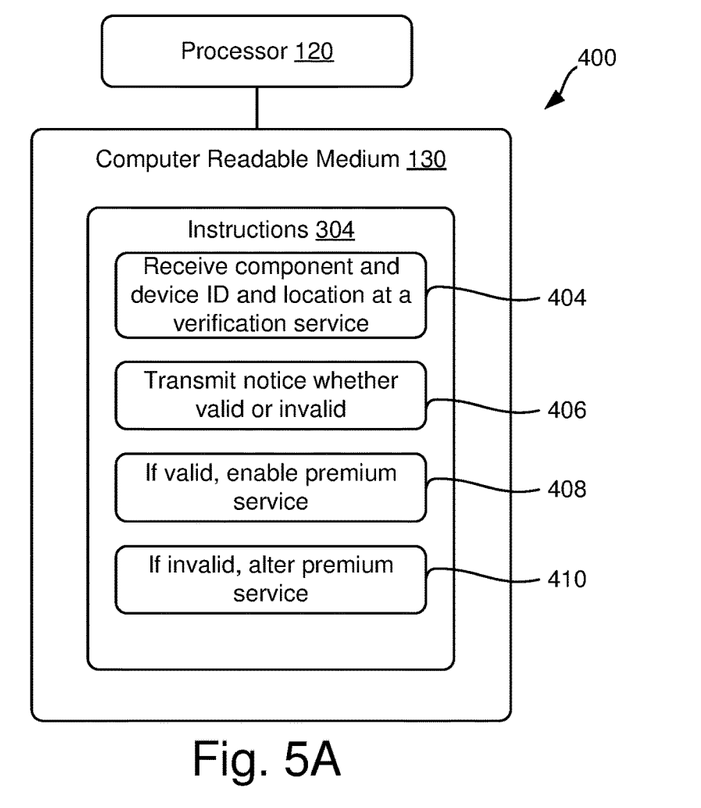
FIG. 5A is a block diagram of an example device for component verification and revocation.

FIG. 5A is a block diagram 400 of an example device 104, 106 or verification service 102 for component verification and revocation. Device 104, 106 includes a processor 120 coupled to a non-transitory computer readable medium 130 that includes instructions 304 that when read and executed by the processor 120 cause the processor 120 to perform operations. For example, in block 404, the processor 120 may receive a component ID 115, a device ID 116, and a location 117 of component 101 at a verification service 102. In block 406, the processor 120 may transmit a notice from the verification service 102 that the component ID 115 is either valid or invalid, that is whether authorized or non-authorized. In block 408, if the component ID 115 is valid, the processor 120 enables a premium service 103 for a device 104, 106. As noted, this premium service 103 may be performed on the device 104, 106 or performed by a service provider 110, 112 or in conjunction together. In block 410, if the component ID 115 is invalid, the processor 120 alters the premium service 103. Altering may include modifying, disabling, terminating, canceling, reducing credits, change the features available, and non-extending the premium service 103. In this example, component 101 is assumed not to have been removed from a device 104, 106 between receipt of a first notice that the component ID 115 is valid and receipt of a second notice that the component ID 115 is invalid. In other examples, component 101 may be removed from a device 104, 106 between the first and second notices and returned to the respective original device.

Figure 5B:
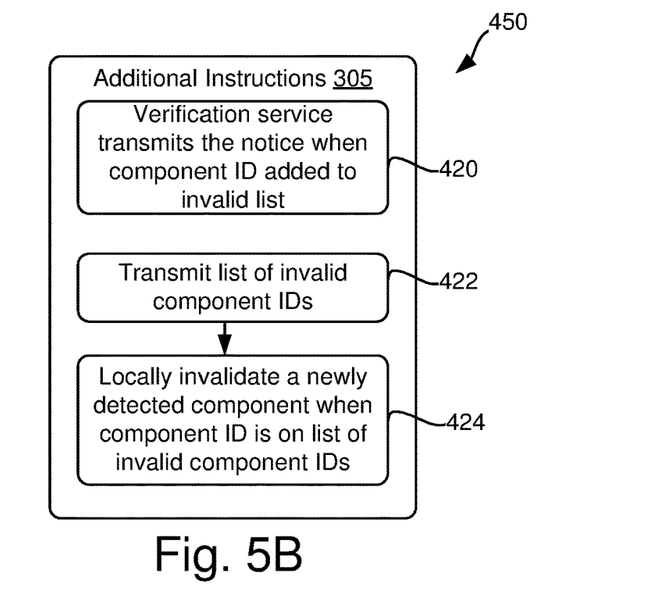
FIG. 5B is a block diagram of example additional instructions for the example device of FIG. 5A.

FIG. 5B is a block diagram 450 of example additional instructions 305 that may be individually or combined with the instructions 304 for the example device 104, 106 of FIG. 5A. In block 420, the additional instructions 305 may cause the processor 120 to transmit a notice from the verification service 102 to respective device 104, 106 when a respective component ID 115 has been added to a list of invalid component IDs. This list addition is based on the component ID 115, a different device ID 116, and a different location 117 having been received by the verification service 102 from another device 104, 106.

In blocks 422 and 424, the additional instructions 305 may cause the processor 120 to transmit a list of invalid component IDs 115 from the verification service 102 and locally invalidate on a device 104, 106 an inserted component 101 by detecting more than one copy of the respective inserted component ID in the list of invalid component IDs. Accordingly, this validation and revocation technique may use a characteristic of how many distinct devices 104, 106 a component 101 was installed in when determining to revoke a previously valid component 101.

In summary, the component verification and revocation techniques described within allows for detecting non-authorized components 101 using location anomalies 114 across many devices 104, 106. These techniques allow a device 104, 106 or verification service 102 to correct previous authentication results provided by the verification service 102. Further, besides location anomalies 114, the number of distinct devices 104, 106 a component 101 was installed in may be used alternatively or in conjunction with the location anomalies 114 in determining the valid status of component 101. If valid, then premium services 103 may be enabled as an incentive to continue to use authorized components 101. If a previously valid component 101 is later found likely to be invalid or non-authorized, then the premium services 103 may be altered or otherwise modified based on the context of the device situation taking into consideration the locations 115 and number of distinct devices 104, 106 using the component 101. These techniques for component verification and revocation assist in preventing misuse, fraud, or unintentional use of components 101 that might not otherwise be detected while still allowing for situations where reasonable use of a component may be expected.

While the claimed subject matter has been particularly shown and described with reference to the preceding examples, those skilled in the art understand that many variations may be made therein without departing from the intended scope of subject matter in the following claims. This description should be understood to include all novel and non-obvious combinations of elements described herein, and claims may be presented in this or a later application to any novel and non-obvious combination of these elements. The preceding examples are illustrative, and no single feature or element is used in all possible combinations that may be claimed in this or a later application. Where the claims recite "a" or "a first" element of the equivalent thereof, such claims should be understood to include incorporation of one or several such elements, neither requiring nor excluding two or more such elements.

What is claimed is:

1. A computer implemented method for component verification and revocation performed by a processor in a device having a device ID, comprising:
   verifying, by the processor, that a replaceable component having a component ID installed within the device is valid, by:
      determining whether a location of the device is different than locations of different devices having different device IDs and associated with a same component ID as the replaceable component;
      in response to determining that the location of the device is different than the locations of the different devices, determining the component is invalid; and
      in response to determining that the location of the device is not different than the locations of the different devices, determining that the component is valid;
   enabling, by the processor, a premium service for the device when the replaceable component is valid;
   determining, by the processor, that the replaceable component is no longer valid; and
   altering, by the processor, the premium service when the component is found invalid, while still permitting usage of the device with the replaceable component installed therein.

2. The method of claim 1, wherein the replaceable component is not removed from the device between the enabling and altering operations.

3. The method of claim 1, wherein the premium service is unrelated to functionality of the replaceable component installed within the device.

4. A non-transitory computer-readable data storage medium storing instructions executable by a processor to perform processing for component verification and revocation performed by a processor in a device having a device ID, the processing comprising:

verifying that a replaceable component having a component ID installed within the device is valid, by:

determining that the component ID is associated with a different device ID of a different device as compared to the device ID of the device;

in response to determining that the component ID is associated with the different device ID as compared to the device ID of the device, determining whether a remaining life value for the replaceable component is greater than a different remaining life value for the component ID associated with the different device ID;

in response to determining that the remaining life value is greater than the different remaining life value, determining that the component is invalid; and in response to determining that the remaining life value is not greater than the different remaining life value, determining that the component is valid;

enabling a premium service for the device when the replaceable component is valid;

determining that the replaceable component is no longer valid; and altering the premium service when the component is found invalid, while still permitting usage of the device with the replaceable component installed therein.

5. The non-transitory computer-readable data storage medium of claim 4, wherein the replaceable component is not removed from the device between the enabling and altering operations.

6. The non-transitory computer-readable data storage medium of claim 4, wherein the premium service is unrelated to functionality of the replaceable component installed within the device.

7. A computing device comprising:

a processor; and a memory storing instructions executable by the processor to:

verify that a replaceable component having a component ID installed within the device is valid;

enable a premium service for the device when the replaceable component is valid;

determine that the replaceable component is no longer valid; and alter the premium service when the component is found invalid, while still permitting usage of the device with the replaceable component installed therein, by determining that the component ID of the replaceable component is associated with one or multiple different device IDs of one or multiple different devices as compared to a device ID of the device;

in response to determining that the component ID of the replaceable component is associated with the different device IDs as compared to the device ID of the device, determining locations of the different devices having the different device IDs; and altering the premium service based on the locations of the different devices.

8. The computing device of claim 7, wherein the replaceable component is not removed from the device between the enabling and altering operations.

9. The computing device of claim 7, wherein the premium service is unrelated to functionality of the replaceable component installed within the device.

* * * * *